(No Model.) 2 Sheets—Sheet 1.

B. F. ARCHER.
MACHINE FOR THRASHING PEAS, BEANS, &c.

No. 300,429. Patented June 17, 1884.

WITNESSES
F. L. Ourand
E. G. Siggers

INVENTOR
Benj. F. Archer
by C. A. Snow & Co.
Attorneys (No Model.) 2 Sheets—Sheet 2.

B. F. ARCHER.
MACHINE FOR THRASHING PEAS, BEANS, &c.

No. 300,429. Patented June 17, 1884.

WITNESSES
F. L. Ourand
E. G. Siggers.

Benjamin F. Archer
INVENTOR by C. A. Snow & Co.
Attorneys

UNITED STATES PATENT OFFICE.

BENJAMIN FRANKLIN ARCHER, OF MARIETTA, MISSISSIPPI.

MACHINE FOR THRASHING PEAS, BEANS, &c.

SPECIFICATION forming part of Letters Patent No. 300,429, dated June 17, 1884.

Application filed February 19, 1884. (No model.)

*To all whom it may concern:*

Be it known that I, BENJAMIN F. ARCHER, a citizen of the United States, residing at Marietta, in the county of Prentiss and State of Mississippi, have invented a new and useful Machine for Thrashing Peas, Beans, &c., of which the following is a specification, reference being had to the accompanying drawings.

This invention relates to machines for thrashing or hulling peas, beans, and the like; and it has for its object to simplify and cheapen the construction and make such machines more durable and efficient in use.

To this end it consists in certain details of construction and combination of parts, as hereinafter particularly set forth, and pointed out in the claims.

Figure 1:
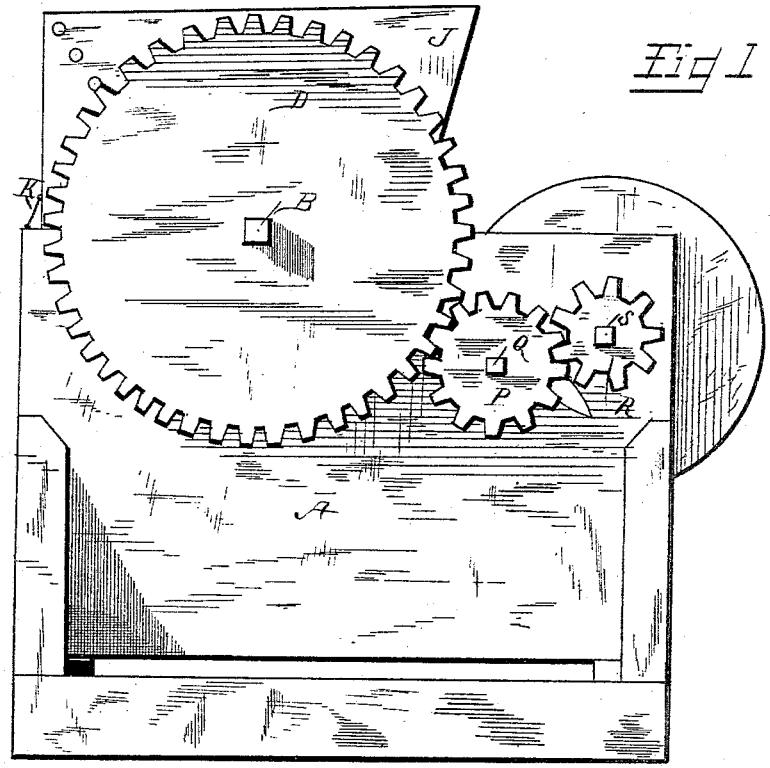
Figure 2:
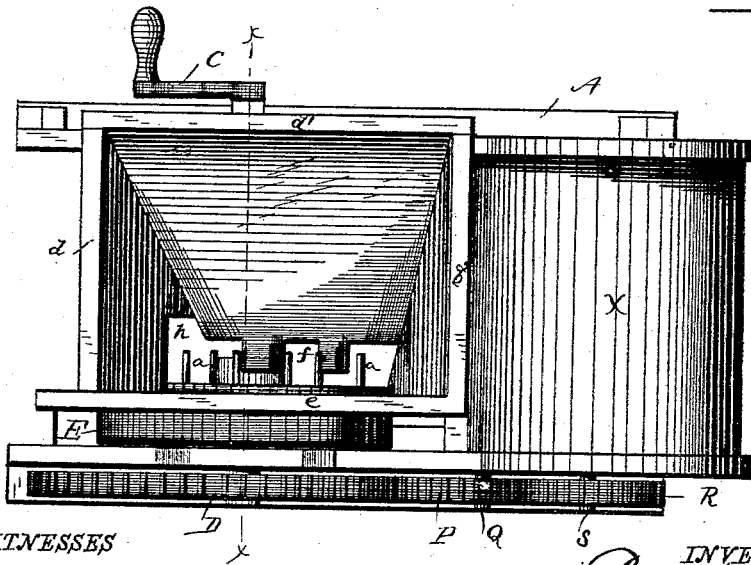
Figure 4:
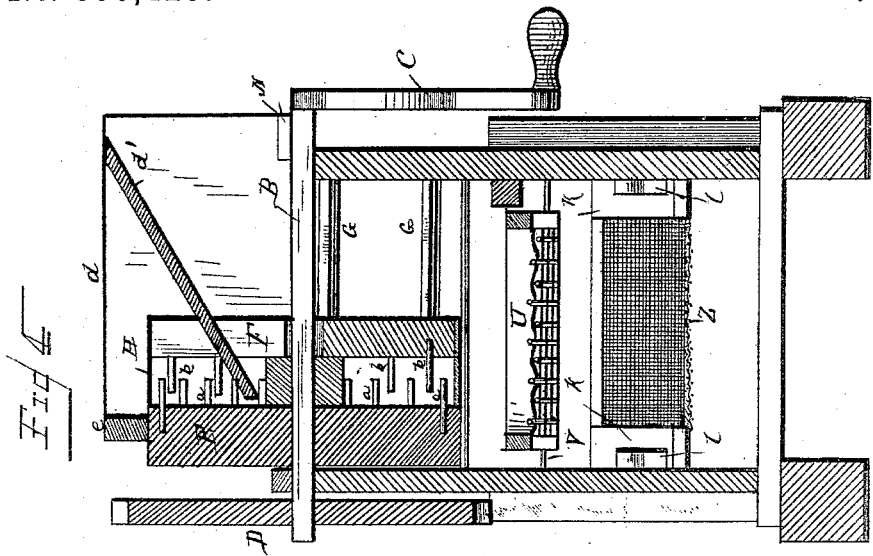
Figure 3:
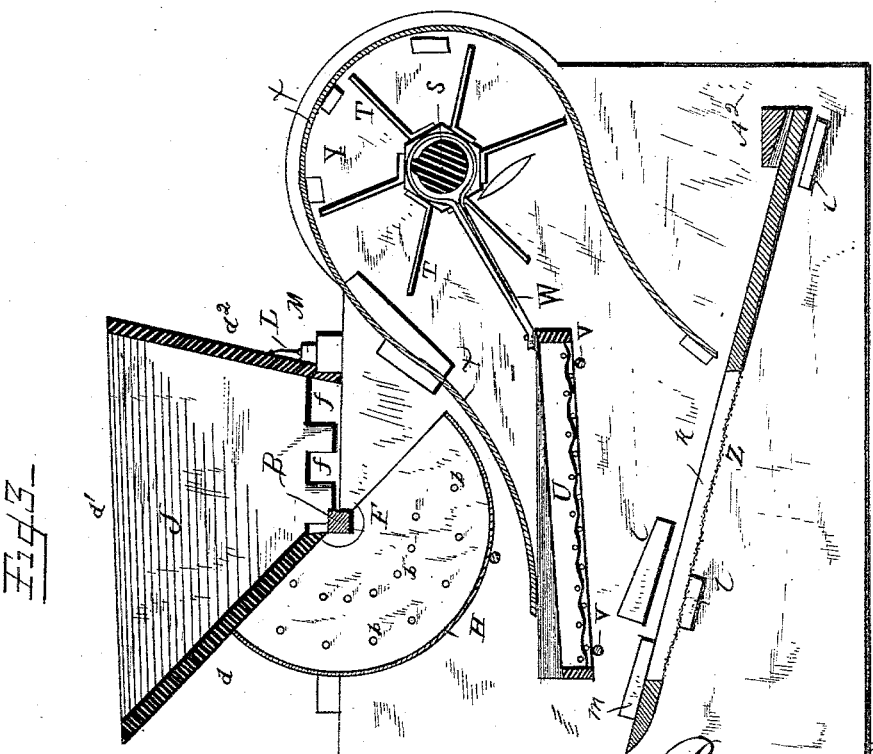

In the accompanying drawings, Figure 1 is a side view of my improved machine. Fig. 2 is a top view. Fig. 3 is a longitudinal section. Fig. 4 is a transverse section on the line $x\ x$, Fig. 2.

The same letters refer to corresponding parts in the several figures.

Referring to the drawings, A designates the frame or outer casing of the machine, which may be of any suitable construction.

B designates a shaft journaled at the top of the frame, and having a crank, C, at one end for operating the same, a large gear-wheel, D, being secured on the opposite end of the shaft outside of the frame. A disk, E, is secured on the shaft at one side adjacent to the gear-wheel, and is provided with a series of teeth or spikes, $a$, which extend inward toward the interior of the machine. A semicircular disk, F, is supported on rigid bearing-rods G G, and is arranged parallel with the revolving disk, a corresponding series of teeth, $b$, projecting outward therefrom, so as to register with the spaces between the teeth on the revolving spiked disk E. A sheathing or guard, H, is secured to the stationary disk F, and extends outward, so as to partly inclose the disk E as it revolves, said sheathing or guard being constructed, preferably, of metal of substantially the same shape as the stationary disk, and adapted to inclose the space between the disks, so as to prevent the escape of the material acted upon.

J designates a hopper, having one side, $e$, curved or cut out to fit over the revolving disk, the remaining sides, $d\ d'\ d^2$, converging inward toward the inner face of the said disk. Said hopper is detachable as desired, suitable hooks and eyes, K L, being used to hold the hopper in place, the hopper being arranged above the disks, and by the converging form of its sides acting to automatically feed the contents thereof to the action of the disks. Stops M N O are secured to the top of the frame, and are adapted to hold the hopper in proper position, in connection with the hooks and eyes aforesaid, the hopper fitting within the stops, as shown. Slots $f$ are cut in the lower end of the side $d'$, to allow the passage of the spikes or teeth on the revolving disk, a recess, $h$, being formed in the side $d$ to permit the passage of the material downward between the disks.

P designates a gear-wheel smaller than the wheel D, and secured on a stud, Q, projecting from the side of the frame, said gear-wheel meshing with the wheel D, and adapted to transmit power to a pinion, R, mounted on the end of the fan-shaft S on the exterior of the frame. The fan-shaft is suitably journaled in the frame, and is provided with a series of radial fans, T, for the purpose well known in the art.

U designates a shaking screen resting upon transverse rods V, extending across the machine, a pitman, W, connecting with the screen at one end and encircling the fan-shaft S at the other end, so that when the fan-shaft is operated it will impart a reciprocating movement to the shaking screen upon the rods V. The top wall, X, of the fan-cylinder Y slopes or extends downward toward the shaking screen, the drums depositing the peas and broken hulls upon the top wall, and by reason of the sloping construction of the latter the crushed material, with the peas, will be fed downward upon the shaking screen. A stationary screen, Z, is arranged below the shaking screen, its sides $k$ working in guides or ways $l$ in the sides of the frame, said screen being inclined at an angle, so as to receive the peas and deposit them in a suitable receptacle. Stops $m$ are secured at one end of the screen Z, and are adapted to abut against the ways $l$ to hold the same in place, the other end of the screen fitting under a transverse bar, A², extending across the machine. It will be seen that the said screen may be readily detached from position when it is desired to clean the same.

The operation of my invention will be readily understood from the foregoing description, taken in connection with the annexed drawings. The crank-shaft B is operated by any suitable power. In the present case I use hand-power applied to the crank C, the material being fed to the hopper in the usual manner. As the shaft turns it transmits motion to the revolving disk, the spikes or teeth of which working in the slots $f$ of the hopper and adapted to draw the material downward, the recess $h$ allowing the material to escape into the space between the stationary and revolving disks, where the spikes or teeth act in conjunction to crush the shells containing the peas, the broken hulls and peas being deposited on the inclined top wall of the fan-cylinder and escaping down upon the shaking screen. By the operation of the crank-shaft the gear-wheel D will be operated to engage with the gear-wheel P and turn the same, the said wheel P meshing with the pinion R to revolve the fan-shaft and cause the fans to turn with a sufficient velocity to create a strong current of air, which will be directed upon the shaking screen to cause the hulls and trash to be blown off, the peas being allowed to escape through the interstices of the shaking screen down upon the stationary screen to the desired receptacle. Thus it will be seen that the action of crushing the shells of the peas and depositing them upon the shaking table will be continuous as long as the material is fed to the hopper, the construction of the latter being such that it will feed the material downward automatically in order that the spikes or teeth may grasp and draw the material downward between the two disks. The sloping construction of the top of the fan-cylinder permits the material discharged from the drums to drop down upon the shaking screen, the fan-shaft acting in the manner described to separate the hulls from the other matter, and the peas being caused to drop by the reciprocating action of the screen down upon the stationary screen, the sloping construction of the bottom wall of the fan-cylinder preventing the material dropped by the shaking screen from escaping outward. The arrangement of the fan is such that it directs a strong current of air upon the shaking screen, which is slightly inclined, and by means of the gearing connecting the fan-shaft with the large gear-wheel said fans are caused to revolve with considerable velocity to effect the purpose stated.

The advantages of my invention are numerous, but they need not be particularly pointed out here.

The construction is simple and durable, and the machine, besides doing the work efficiently, can be manufactured at slight cost.

Having described my invention, I claim—

1. In a thrashing-machine, the combination, with the supporting-frame and the thrashing-disks, of the detachable hopper arranged above the same, one side, $e$, being vertical and fitting over one of the disks, and the remaining sides converging inward toward the inner face of the disks, a series of slots, $f$, cut in the hopper to allow the passage of the spikes of the disks, suitable stops secured to the frame for receiving the lower ends of the hopper, and hooks and eyes to secure the hopper in place, as set forth.

2. In a thrashing-machine, the combination, with the frame, operating-shaft, and hopper, of the revolving and stationary disks, the fan-cylinder Y, the fan-shaft, gearing connecting the fan-shaft with the operating-shaft, the inclined shaking screen, the stationary screen Z, arranged below the shaking screen, the top wall, X, of the fan-cylinder, sloping or curving downward, so that the material is deposited on the shaking screen; and the bottom wall of the cylinder, likewise sloping or curving downward, so as to prevent the material dropped from the shaking screen from escaping outward, as set forth.

In testimony that I claim the foregoing as my own I have hereto affixed my signature in presence of two witnesses.

BENJAMIN FRANKLIN ARCHER.

Witnesses:
J. R. LIDBETTER,
M. T. HARRIS.